Figure 4:
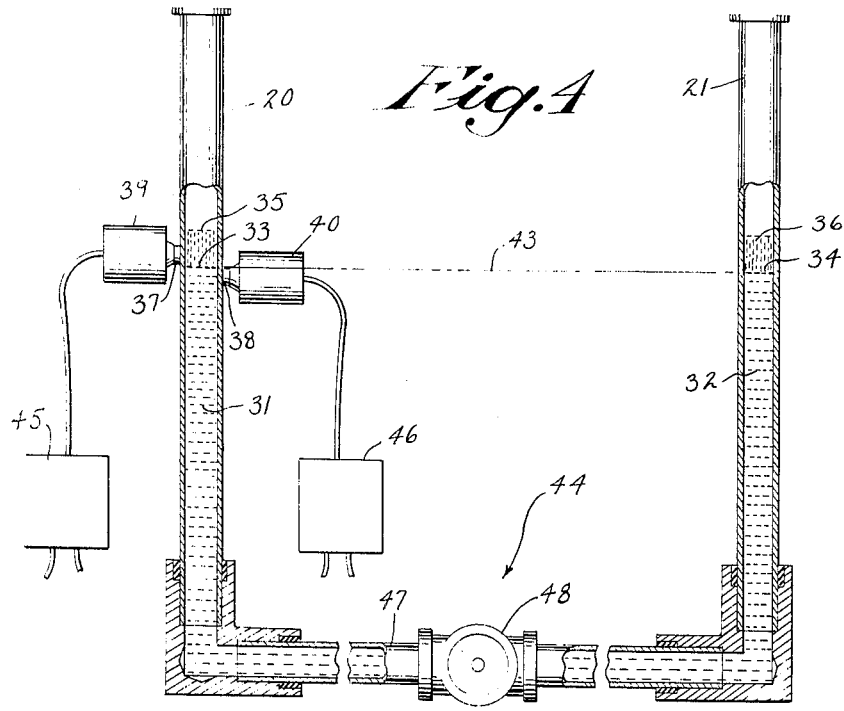

Feb. 22, 1966     D. E. BARBER     3,236,535
LEVEL SENSING DEVICE
Filed March 30, 1964     2 Sheets-Sheet 1
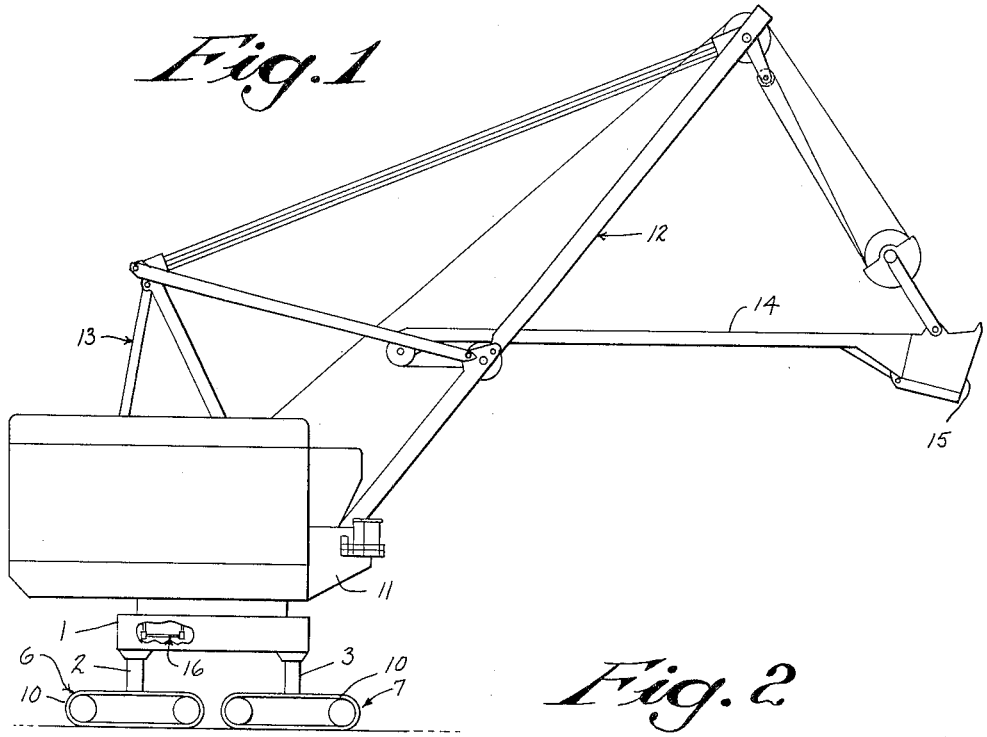
INVENTOR
DONALD E. BARBER
BY Thomas O. Kloehn
ATTORNEY Feb. 22, 1966 D. E. BARBER 3,236,535
LEVEL SENSING DEVICE
Filed March 30, 1964
2 Sheets-Sheet 2

INVENTOR
DONALD E. BARBER

BY Thomas

ATTORNEY

United States Patent Office 3,236,535
Patented Feb. 22, 1966

3,236,535
LEVEL SENSING DEVICE
Donald E. Barber, South Milwaukee, Wis., assignor to Bucyrus-Erie Company, South Milwaukee, Wis., a corporation of Delaware
Filed Mar. 30, 1964, Ser. No. 355,597
8 Claims. (Cl. 280—6.1)

The present invention relates to a level sensing apparatus for comparing the attitude of a line with horizontal and emitting a control signal when the attitude of said line varies from a predetermined norm; and more particularly the present invention resides in the combination of a pair of vessels mounted in fixed relationship to one another along a line, the attitude of which is to be compared with the horizontal, said vessels being filled with a liquid to a preset level when the attitude of said line coincides with a predetermined norm, a conduit communicating between said vessels for conducting liquid from one of said vessels to the other vessel, and a pair of proximity sensing devices responsive to said liquid in said vessels, mounted to sense the level of the liquid in said vessels and adapted to emit a signal when said level of said fluid in said vessels varies from said preset level as a result of a deviation in the attitude of said line from the predetermined norm.

The present invention provides an improved level sensing device intended for immediate commercial use in large excavating machines, but not limited in its application to those machines. Excavating equipment of the sort referred to are very large machines. Generally, these excavators have a base mounted at each of its corners on a hydraulic jack, each of which stands on a crawler having a pair of power driven endless treads. The base mounts a cab, and a boom and gantry from which a dipper stick with a dipper on its end is supported, and power equipment in the cab rotates the cab on its base and operates to drive the dipper through its necessary functions. A deviation of the base from level may be magnified many times at the top of the boom where the weight of a load in the dipper is supported. Hence, the need for some means of keeping the base level is clearly evident. Also, due to the extraordinary large size and capacity of the power equipment and the many forces exerted upon it, its extended operation in an unlevel position can result in destruction of the bearings on the various drive shafts.

Commonly, prior art devices utilize either a partially filled U-shaped vessel of mercury, or a small pool of mercury in a glass envelope, to make or break electrical contacts as the fluctuating attitude of the base of the machine causes the mercury to flow. Since these devices utilize mercury to make and break electrical contacts mechanically, they require substantial and rapid changes of mercury level to avoid burning the electrical contacts, and to achieve that, sensitivity must be sacrificed. Because of this, the prior art devices can level a base to within only about a foot from horizontal. Also an unavoidable side effect of permitting the necessary rapid, high volume mercury flow is the sloshing of mercury in the system in response to normal machine vibration, and that sloshing is sometimes sufficient to cause spurious making and breaking of contacts causing the leveling system to hunt, or even lapse into oscillation.

The present invention overcomes the deficiencies of the prior art by utilizing, in the embodiment to be described, two vessels containing mercury mounted along a selected line on the device to be leveled, which line is to be maintained horizontal, and these vessels are joined by a conduit capable of conducting a relatively small volume of mercury between the vessels. A pair of sensing heads for proximity sensing devices are mounted either adjacent one of the vessels above and below the meniscus of the mercury, or adjacent each of the vessels at the level of the meniscus of the mercury in the vessels, when the selected line is level with horizontal, so that if the mercury level or meniscus moves away from its normal position past one of the senesing heads, the device will emit an electrical signal which is used to control a leveling mechanism. The control signal output from the proximity sensing device will trigger the leveling mechanism to raise that vesseel to restore the mercury to its normal level.

The combination of the present invention permits detection of much more slight and gradual deviations from level than had previously been possible. As a specific example, an installation of an embodiment of the present invention maintains a base of an excavator within inches from horizontal. Yet, since the increased sensitivity of the present invention necessitates only minimal mercury flow and an embodiment of the present invention avoids the hunting and oscillation of the leveling mechanism caused by the prior art devices. For example, this sensing device may be used when the excavator or other machine is being propelled from one location to another, whereas the prior art devices were much too unstable for such use.

Accordingly, it is an object of the present invention to provide a highly sensitive gravity actuated level sensing apparatus.

It is another object of the present invention to provide a very stable and reliable level sensing apparatus.

It is another object of the present invention to provide a level sensing apparatus of comparatively low initial cost and minimum maintenance requirements.

It is another object of the present invention to provide a level sensing apparatus in which the attitude responsive element may be visually examined to ensure its operative condition.

The foregoing and other objects will appear in the description to follow. In the description, reference is made to the accompanying drawings which form a part hereof and in which there is shown by way of illustration three specific embodiments in which this invention may be practiced. These embodiments will be described in sufficient detail to enable those skilled in the art to practice this invention, but it is to be understood that other embodiments of the invenion may be used and that structural changes may be made in the embodiments described without departing from the scope of the invention. Consequently, the following detailed description is not to be taken in a limiting sense; instead, the scope of the present invention is best defined by the appended claims.

Figure 5:
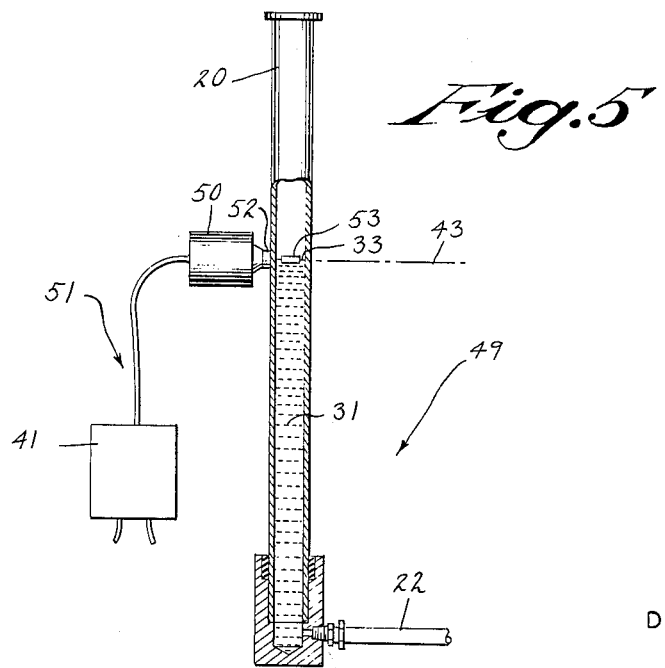

In the drawings:

FIG. 1 is a schematic side elevation of an excavating machine with a portion broken away to illustrate a preferred location of apparatus embodying the presenet invention therein, FIG. 2 is a top view of a base of an excavating machine, such as is shown in FIG. 1, with portions broken away to illustrate a preferred location of an embodiment of the present invention in such a base including a schematic block diagram of the present invention connected to actuate an hydraulic leveling mechanism of the base, FIG. 3 is a side elevation partially in section of a level sensing apparatus embodying the present invention, FIG. 4 is a side elevation partially in section of a second embodiment of a level sensing apparatus embodying the present invention, and FIG. 5 is a side elevation paritally in section of a portion of a third embodiment of a level sensing apparatus embodying the present invention.

Referring now specifically to the drawing, FIG. 1 illustrates a large excavator utilizing the present invention.

This excavator has a base 1 which is supported at each of its four corners by hydraulic jacks 2, 3, 4 and 5 which are mounted on crawlers 6, 7, 8 and 9, respectively, each of which has a pair of power driven endless treads 10. A cab 11 is rotatably mounted on the base 1, a boom 12 rises front the front of the cab 11, and a gantry 13, rising from the top of the cab 11, supports a dipper stick 14, which has a dipper 15 on the end. A portion of the base 1 is broken away to illustrate the general location of a level sensing apparatus 16 embodying the present invention mounted in an excavator. The level sensing apparatus 16 is, of course, magnified out of proportion with the excavator so that it is readily visible in the drawings.

FIG. 2 is a top view of the base 1 with portions broken away to illustrate preferred locations in the base 1 of a pair of identical level sensing apparatuses 16 and 17 of the present invention, and FIG. 2 also schematically illustrates the relationship of the level sensing apparatuses 16 and 17 and a hydraulic leveling mechanism of the excavator. Once again the level sensing apparatuses 16 and 17 are magnified many times relative to the size of the base 1 so that they will be readily visible, and the extent of this magnification will become apparent in connection with the more detailed description of the level sensing apparatus 16 as shown in FIG. 3. Here it is pertinent to note that in the larger excavators of this type the base 1 may be as large as 48 feet on a side, the top of the cab 5 may be 100 feet off the ground, and the boom 6 may rise well over 200 feet above the ground.

One level sensing apparatus 16 is shown in FIG. 2 mounted along a diagonal member 18 of the base 1, and the other level sensing apparatus 17 is mounted along the other diagonal member 19 of the base 1, so that together they will register a deviation from the level in either of the two diagonals 18 and 19 of the base 1. Each of the level sensing apparatuses 16 and 17 of the present invention has a pair of vessels 20 and 21 connected by a conduit 22. Associated with the vessels 20 and 21 and the conduit 22 are a pair of proximity switches 23 and 24 which detect a deviation from level sensed by means of the vessels 20 and 21 and the conduit 22, and provide an appropriate output signal for controlling the leveling mechanism. The proximity switches 23 and 24 are connected to an hydraulic leveling mechanism control designated generally by the box 25. The hydraulic leveling mechanism as a whole includes the control 25, which may be a complex of pumps and valves, a system of hydraulic fluid conduits, generally represented by the lines 26 in the drawing, and the jacks 2, 3, 4 and 5 so that control signals from the amplifiers 16 and 17 can actuate the leveling mechanism 17 to raise or lower one or more of the jacks 2, 3, 4 and 5. The hydraulic system, as represented here by the box 25 and lines 26 connecting those boxes to the jacks 2, 3, 4 and 5, is not a part of the present invention, but it may be one of several highly complex systems, which have long been used in commercial models of such excavating machines and hence well known to the art. Nor is it necessary to the present invention that the leveling mechanism be hydraulic, for it may be mechanical or any combination of systems that would accomplish the purpose.

FIG. 3 illustrates the present invention apart from its environment shown in FIGS. 1 and 2. As seen in FIG. 3, each of the vessels 20 and 21 is a vertically mounted, clear plastic tube, which is approximately two feet long, and has one inch outside diameter, and ¾ inch inside diameter. The bottom ends of the vessels 20 and 21 are threaded for mounting in the corner blocks 27 and 28, so that about 20 inches of tube extends upward from the top of the corner blocks 27 and 28. Due to the nature of mercury and the fluid pressures involved, care must be taken to obtain a good seal between the corner blocks 27, the vessels 20 and 21 and the conduit 22. The conduit 22 joining the two vessels 20 and 21 is a steel pipe having an ⅛ inch internal diameter and being approximately 10 feet long. Each end of the conduit 22 is provided with an appropriate fitting 29 for mounting in the respective corner blocks 27 and 28. The conduit 22 is filled with mercury 30, and each of the vessels 20 and 21 is partially filled by columns of mercury 31 and 32 to a predetermined level, so that the meniscuses 33 and 34, or tops of the columns of mercury 31 and 32, will be at a predetermined normal height when the base 1 is level. Floating on the meniscuses 33 and 34 on the columns of mercury 31 and 32 are layers of an inert fluid, which in this embodiment are silicone, fluid layers 35 and 36, sealing the mercury of the columns 31 and 32 from the atmosphere.

Adjacent the meniscuses 33 and 34 of each of the columns of mercury 31 and 32 is a face 37 and 38 of sensing heads 39 and 40 of a proximity switch 23 and 24 which are mounted in fixed positions relative to their adjacent vessels 20 and 21. The proximity sensing devices in the form of the proximity switches 23 and 24 referred to specifically here are available commercially and come as a package including a sensing head 39 or 40, and a control signal source 41 or 42, which in the commercial device contain a power supply and a relay actuated by a signal from the appropriate sensing head 39 or 40. The sensing heads 39 and 40 each contain an oscillator connected to a coil to produce a high frequency magnetic field projecting a short distance from faces 37 and 38 to be loaded by the close proximity of a body of metal, such as the mercury columns 31 and 32 which thus varies the amplitude of the oscillator signal, and that variation in amplitude of the oscillator signal is detected to produce an output signal. The invention is not limited to this specific proximity sensing device that has been described here by way of illustration of a preferred embodiment of the invention.

While no single one of the dimensions listed above for the apparatuses 16 and 17 may be considered critical to the invention, the relationship of all the dimensions is of great importance. If the vessels 20 and 21 have too large a cross section, the mercury in columns 31 and 32 will tend to slosh with the normal movement of the base 1 when the excavator is in operation, resulting in spurious actuation of the proximity switches 23 and 24 and hence the entire leveling mechanism. Also, if the vessels 20 and 21 are made too large, an excessive amount of expensive mercury will be required, unnecessarily increasing the cost of the apparatuses 16 and 17. On the other hand, if the vessels 20 and 21 are too small they may lack the requisite physical strength to withstand the normal stresses to which they will be subjected, and if they are reduced in size too much, the movement of the mercury within them may be throttled to the extent that they would become inoperative. Also, the vessels 20 and 21 should have sufficient height so that when the base 1 is at its maximum possible deviation from level, the mercury in the columns 31 and 32 will not spill out of them.

In the preferred embodiment of the invention described here, the clear plastic tubes were chosen for the vessels 20 and 21 for several reasons. The type of proximity switch 23 and 24 used necessitated nonmetallic vessels 20 and 21. Also, for this use, a rugged material is preferable. Finally, since the plastic is transparent, visual examination of the mercury level and condition is possible, ensuring safe operating conditions. Clearly other materials could be used with other types of proximity sensing devices. Also, an opaque plastic, or a ceramic, or any other suitable nonmetallic material could be used with the proximity switches 23 and 24.

The horizontal conduit 22 must also be selected to have proper dimensions. In this connection, the two most important dimensions are its length and its inner diameter. The relatively small dimeter of the horizontal conduit 22 will have a throttling action on the mercury 30 flowing through it. For any given diameter of the horizontal conduit 22, the greater the length, the greater the throttling action. On the other hand, if the diameter of the horizontal conduit 22 is too large, sloshing of the mercury 30 and hence the columns 31 and 32 may result. However, if the diameter of the horizontal conduit 22 is made too small, the resultant delay in the response of the system to a change in attitude of the base may be excessively long. For example, the present apparatus 16 or 17 was tested utilizing a conduit 22 of tubing having an outside diameter of 1/8 inch and a length of ten feet, and it was found that the response time of the apparatus 16 or 17 to a variation in the height of one of the vessels 20 or 21 to the other vessel 21 or 20 was almost two minutes. However, by converting from the tube with the 1/8 inch outside diameter to a pipe with a 1/8 inch inside diameter, the response time was reduced down to several seconds. With a shorter conduit 22, a smaller cross sectional area is of course tolerable, but, on the other hand, with a longer conduit 22 a larger inner diameter is required.

Another dimension to be considered is the distance between the two vertical mercury columns 31 and 32. The greater the distance between the mercury columns 31 and 32, the greater the sensitivity of the apparatus. This follows from the fact that the proximity limit switches 23 and 24 will respond to a fixed minimum change in the level of the meniscuses 33 and 34, and the minimum is 3/16 inch in the commercial proximity switches 23 and 24 referred to above. A given difference in the height of the vessels 20 and 21, such as 3/16 inch, when the vessels 20 and 21 are separated by 10 feet represents a much smaller angle of deviation than the same difference in height of the vessels 20 and 21 if they were separated by a lesser distance, for example, five feet. In summary, it has been found by empirical methods that for an excavator of the size described here, the straight conduit 22 separating by ten feet the vessels 20 and 21, which have a 3/4 inch inner diameter, has an optimum inner diameter of 1/8 inch.

The silicone fluid layers 35, 36 on top of each of the mercury columns 31 and 32 perform two functions. First, they protect the mercury columns 31 and 32 from oxidation, other chemical deteriorations and contamination. This is important for the optimum operation of the proximity limit switches, and to avoid maintenance, since the tubes 20 and 21 are open at the top. Secondly, the silicone fluid layers 35, 36, as they rise and fall in the tubes 20 and 21, lubricate the sides of those tubes 20 and 21 so as to eliminate whatever friction might exist between the tubes and the mercury columns 31 and 32. Although silicone is used here, any suitable inert fluid could be substituted therefor.

To describe the operation of this first embodiment, assume that the lower left hand corner of the base 1 of the excavator in FIGS. 1 and 2 drops down as the crawler 6 is propelled on its endless tread into a depression in the terrain. The vessel 20 on the left in FIGS. 1, 2 and 3 will also be lowered relative to the vessel 21 on the right. As a result, the mercury column 32 in the vessel 21 on the right under the force of gravity, being higher than the column 31 in the vessel 20 on the left will cause the mercury 30 in the conduit 22 to flow to the left to raise the level of the column 31 on the left, while mercury from the column 32 on the right flows into the conduit 22 lowering its own level, until the meniscuses 33 and 34 of the columns 31 and 32—and hence the hypothetical line 43 between them—are once again level. When the meniscus 33 of the mercury column 31 on the left rises past the face 37 of the adjacent sensing head 39, the magnetic field generated in the head 39 is loaded and the amplitude of the oscillator signal drops to trigger an output signal to the control signal source 41. The output signal to the control signal source 41 will actuate its relay to send a control signal to the hydraulic leveling mechanism control 25. Hydraulic fluid will then be pumped through appropriate conduits represented by the lines 26 to raise the jack 2.

A second embodiment of the present invention is illustrated in FIG. 4 showing a level sensing apparatus 44. The level sensing apparatus 44 shown in FIG. 4 may, in many respects, be identical to that shown in FIG. 3, so where the same elements could be used in both, the same reference numerals will be applied and no further description of those elements will be given here.

The first major distinction between the first and second embodiments lies in the location of the second sensing head 40, which instead of being mounted adjacent the right hand vessel 21, is also mounted adjacent the left hand vessel 20. The sensing head 39 on the left side of the vessel 20 is mounted above the meniscus 33 and the relay (not shown) in its signal source 45 is normally open. The sensing head 40 on the right side of the vessel is mounted so that its face 38 is below the meniscus 33 and the relay (not shown) in its control signal source 46 is normally closed, but since the sensing head 40 is continually transmitting a reduced output so long as the meniscus 33 is in its present, normal position shown, the relay (not shown) is held open.

The second distinction between the first and second embodiments resides in the difference between the conduit 22 of the first embodiment and the conduit 47 of the second embodiment which communicate between the mercury columns 31 and 32. Whereas the conduit 22 of the first embodiment was of minimum inside diameter, the conduit 47 of the second embodiment has a comparatively large inner diameter, but the condit 47 in the second embodiment is also fitted with a controllable valve 48, whereby the flow capacity of the conduit 47 may be throttled to a desired amount. In either embodiment, the liquid flow capacity of the conduit 22 or 47 will be small as compared to the capacity of the vessels 20 and 21 to avoid sloshing.

For the operation of the second embodiment, it is not necessary that the conduit 47 with the valve 48 be used, since that combination is interchangeable with the conduit 22 with its constricted inner diameter of the first embodiment. Assume, then, that whichever is used, the liquid flow capacity between the vessels 20 and 21 is established at the appropriate amount. If the corner of the base 1 closest to the left column 20 drops, the meniscus 33 of the mercury column 31 will rise and the upper sensing head 39 on the left will detect the change, causing the relay (not shown) in its control signal source 45 to close, sending an appropriate signal to the control 25 of the leveling mechanism. If, on the other hand, the left hand vessel 20 is raised relative to the right hand vessel 21, the meniscus 33 of the mercury column 31 will drop, and this change will be detected by the lower right sensing head 40, which will deenergize the relay (not shown) in its control signal source 46, permitting the relay to close and send an appropriate signal to the control 25 of the leveling mechanism.

The third embodiment is illustrated by the portion of a level sensing apparatus 49 shown in FIG. 5. Although only one vessel 20 is illustrated, it is understood that a second vessel 21 is necessary to complete the apparatus 49. The level sensing apparatus 49 of the third embodiment differs from the embodiment shown in FIGS. 3 and 4 in that the level of the mercury column 31 is not directly sensed by a sensing head 50 of a proximity sensing device 51. The sensing head 50 is responisve to a magnetic field in close proximity to its face 52. A permanent magnet 53 material is floated on top of the mercury column 31, and as the mercury column 31 varies, the sensing head 50 will detect the variation by responding to the proximity or remoteness of the magnet 53. The other components of this embodiment may be the same as those of the above described embodiments. Since the mercury column 31 itself is not detected by the sensing head 50, it is abundantly clear that any fluid of suitable properties may be substituted for mercury. The proximity sensing device 51, like those shown in the previous embodiments is a commercially available item, and taken alone is not represented here as being in any way novel.

Stated generally, it may be said that the level sensing apparatuses 16, 17, 44, or 49 of the present invention compare a predetermined hypothetical straight line 43 between the liquid columns 31 and 32 in the vessels 20 and 21 with the horizontal. As that hypothetical line 43 deviates from a preset norm, which is determined by the fixed relative mounting of the vessels 20 and 21 and their corresponding proximity sensing devices 23 and 24, or 51, the levels of the meniscuses 33 and 34 are permitted to vary under the force of gravity by virtue of the conduit 22 communicating between the liquid columns 31 and 32. In the preferred embodiment, the vessels 20 and 21 with their respective proximity limit switches are mounted so as to be normally at the same level, the norm of the predetermined line 43 is horizontal, and in the embodiments shown could coincide with the conduit 22 which is straight and which is also normally horizontal. That is not necessary. It is only required that a preset norm be established for the hypothetical line 43 which is to be compared with the horizontal, and then that the vessesl 20 and 21 with their proximity sensing devices 23 and 24 be mounted accordingly, with a conduit 22 of some sort communicating between the liquid columns 31 and 32 at all possible attitudes of that hypothetical line 43.

Mercury is a conventional fluid for the purposes of this embodiment, but a colloidal suspension of a metallic material in another liquid having appropriate density, viscosity and nonadherence to the walls of the conduit 22 and the vessesl 20 and 21, may be used. Also, a different liquid 30 may be used in the conduit 22 from the liquids of the columns 31 and 32, provided the liquids are substantially nonmiscible, or are separated by a flexible membrane. One might also substitute for the electromagnetic proximity limit switches, for example, a radioactive responsive device, and substitute a radioactive material in a liquid for the mercury columns 31 and 32, permitting the use of metallic vessels 20 and 21 instead of the plastic tubes 20 and 21 shown, if so desired.

The invention disclosed herein and set forth in the claims to follow provides a relatively inexpensive, maintenance free, sensitive, stable and reliable level sensing apparatus. Apparatus embodying the present invention, as distinguished from the prior art, has vibration damping built into it in the small inside diameters of the vessels 20 and 21 and the throttling in the conduits 22 and 47. However, apparatuses of the present invention also exceed the devices of the prior art in sensitivity. These objectives are achieved with a minimum number of components and components of great stability, reliability and longevity. In this latter respect, particularly, the present invention excels the electric eye device shown in Patent No. 2,268,017, which is essentially a position detecting device requiring separate transmitting and receiving apparatuses, each of which is delicate and made up of components having comparatively short life.

In this disclosure alternative expedients have been suggested for the various components of the embodiment disclosed. Also the embodiments shown have been applied only in excavators, but the present invention is also usable in any vehicle, since it is sufficiently stable for use on a moving vehicle. These alternatives, however, are not intended as an exhaustive catalogue but merely an indication of some of the possibilities. Hence, the scope of the invention is to be determined, not by the limitations of the preceding disclosure, but rather by the claims to follow.

I claim:
1. In a level sensing apparatus, the combination comprising:
a pair of vessels mounted in fixed spacial relationship to one another along a line to be compared with horizontal the attitude of said line being variable so as to move said vessels vertically relative to one another;
a liquid normally filling each of said vessels to a predetermined level;
a conduit communicating between said liquid in said vessels, said conduit being filled with a liquid and adapted to have a small fluid conducting capacity as compared with the capacity of said vessels;
and a proximity sensing device mounted adjacent each of said vessels, responsive to the proximity of said liquid in said vessels and adapted to emit a signal when said level of liquid in said vessels varies from said predetermined normal level.

2. In a leveling system control, the combination comprising:
a leveling mechanism;
an object mounted to have its attitude determined by said leveling mechanism;
a control responsive to a control signal for controlling said leveling mechanism;
a pair of vessels mounted on said object and spaced along a line to be leveled the attitude of said line and said object being variable so as to move said vessels vertically relative to one another;
a liquid normally partially filling said vessels, and said liquid in said vessels having their meniscuses at a preset normal height to define said line to be leveled;
a conduit communicating between the lower ends of said vessels, being filled with said liquid, and having a small liquid conducting capacity as compared to the capacity of said vessels;
and a proximity sensing device mounted adjacent said vessels, responsive to the proximity of said liquid, and adapted to emit a control signal to said control when said meniscuses on said liquid in said vessels deviate from said normal predetermined height to control said leveling mechanism to change the attitude of said object so as to restore said normal fluid level in said vessels.

3. In a level sensing device, the combination comprising:
a pair of plastic vessels closed at their lower ends and mounted in fixed spacial relationship along a line to be compared with horizontal the attitude of said line being variable to move said vessels vertically relative to one another;
a column of mercury of predetermined height contained in each of said vesesls;
a tubular conduit of small diameter as compared with said vessels, filled with mercury and communicating between said columns of mercury in said vessels to permit mercury to flow between said columns under the force of gravity;
and an electric proximity switch mounted adjacent each of said vessels relative to said predetermined height of said columns of mercury to emit a signal when the height of said columns of merucry deviates from said normal height under the force of gravity.

4. In a level sensing apparatus as set forth in claim 3, a layer of inert liquid floating on top of said mercury in each of said vessels.

5. A level sensing apparatus comprising the combination of
a pair of substantially vertical columns of mercury in fixed spaced relationship substantially normal to a line to be compared to horizontal and having a predetermined normal height the attitude of said line being variable to move said columns vertically relative to one another;
a conduit filled with a liquid, communicating between said columns of mercury, and adapted to have a small liquid flow capacity as compared to the volume of mercury in said columns;
and a mercury proximity sensing device mounted to be adjacent to a predetermined normal level of the tops of said columns of mercury and adapted to emit a signal when the height of said columns varies from said predetermined normal height.

6. In an apparatus for maintaining the base of an excavator substantially level, the combination comprising:
an excavator base mounted on a plurality of vertically adjustable jacks;
a power driven leveling mechanism having a control to cause said system to vertically adjust said jacks individually and simultaneously in groups of two or more jacks according to a leveling control signal fed to said control unit;
a pair of substantially vertical plastic tubes mounted in horizontal spaced relationship along a diagonal of said excavator base said diagonal normally rocking during operation of said excavator to raise and lower said tubes relative to one another;
a conduit communicating between said plastic tubes near the lower ends of said tubes and having a comparatively small diameter relative to said tubes;
a column of mercury partially filling each of said tubes to a predetermined normal height, and completely filling said conduit;
and an electric proximity switch mounted adjacent each of said tubes opposite the normal heights of said columns of mercury and conected to transmit a leveling control signal to the controls when the heights of said columns of mercury vary from said predetermined normal height.

7. In a level sensing apparatus, the combination comprising:
a pair of vessels each containing a column of liquid having meniscuses at a predetermined normal position, said vessels being mounted along a line of varying angular attitude with the horizontal said line to be compared with horizontal;
a conduit communicating between said columns of liquid in said vessels and being filled with a liquid;
a pair of proximity sensing devices responsive to the proximity of said liquid in said vessels mounted to detect a deviation in the position of said meniscus of one of said columns of liquid from said normal position as said attitude of said line varies moving said columns vertically relative to one another.

8. In a level sensing apparatus, the combination comprising:
a pair of vessels each containing a column of liquid of predetermined normal height, said vessels being mounted along a line to be compared with horizontal and said line being of varying angular attitude with the horizontal to move said vessels vertically relative to one another;
a conduit communicating between said columns;
a material supported by said liquid columns;
and proximity of sensing devices responsive to the proximity of said material supported by liquid columns mounted relative to said columns to detect a deviation from said normal height of said columns when said vessels move vertically relative to one another.

References Cited by the Examiner
UNITED STATES PATENTS

| | | | |
|---|---|---|---|
| 347,589 | 8/1886 | Ghegan | 200—84.3 |
| 986,210 | 3/1911 | Pearson | 200—84.3 |
| 2,062,674 | 12/1936 | Pirwitz | 200—84.3 |
| 2,101,837 | 12/1937 | Blanchett | 280—6 X |
| 2,142,680 | 1/1939 | Shrode | 200—84.3 |
| 2,202,009 | 5/1940 | Knox | 280—6.1 |
| 2,268,017 | 12/1941 | Busick | 280—6.1 |
| 2,859,393 | 11/1958 | Anderson | 200—112 |

BENJAMIN HERSH, *Primary Examiner.*

LEO FRIAGLIA, *Examiner.*

UNITED STATES PATENT OFFICE
CERTIFICATE OF CORRECTION

Patent No. 3,236,535                                    February 22, 1966

Donald E. Barber

It is hereby certified that error appears in the above numbered patent requiring correction and that the said Letters Patent should read as corrected below.

Column 1, line 43, for "extraordinary" read -- extraordinarily --; column 2, line 46, for "invenion" read -- invention --; line 55, for "presenet" read -- present --; line 68, for "paritally" read -- partially --; column 3, line 6, for "front", first occurrence, read -- from --; column 6, line 19, for "present" read -- preset --; line 66, after "the", first occurrence, insert -- height of the --; column 7, line 32, for "vessesl" read -- vessels --; column 8, line 56, for "merucry" read -- mercury --; column 9, line 26, for "conected" read -- connected --; line 35, after "horizontal" insert a comma; column 10, line 18, strike out "of.

Signed and sealed this 24th day of January 1967.

(SEAL)
Attest:

ERNEST W. SWIDER                                    EDWARD J. BRENNER
Attesting Officer                                          Commissioner of Patents